(12) United States Patent
Alfes

(10) Patent No.: US 8,714,907 B2
(45) Date of Patent: *May 6, 2014

(54) ARRANGEMENT COMPRISING A SHAFT SEAL

(75) Inventor: Ludger Alfes, Dorsten (DE)

(73) Assignee: Siemens Aktiengesellschaft, München (DE)

( * ) Notice: Subject to any disclaimer, the term of this patent is extended or adjusted under 35 U.S.C. 154(b) by 543 days.

This patent is subject to a terminal disclaimer.

(21) Appl. No.: 13/120,923

(22) PCT Filed: Sep. 3, 2009

(86) PCT No.: PCT/EP2009/061404

§ 371 (c)(1),
(2), (4) Date: Mar. 25, 2011

(87) PCT Pub. No.: WO2010/034601

PCT Pub. Date: Apr. 1, 2010

(65) Prior Publication Data

US 2011/0189013 A1 Aug. 4, 2011

(30) Foreign Application Priority Data

Sep. 25, 2008 (DE) .......................... 10 2008 048 942

(51) Int. Cl.
*F04D 29/10* (2006.01)
(52) U.S. Cl.
USPC ....................................................... 415/111
(58) Field of Classification Search
USPC ........... 415/110, 111, 112, 170.1, 171.1, 230, 415/231; 277/361, 362, 363, 364, 369
See application file for complete search history.

(56) References Cited

U.S. PATENT DOCUMENTS

| | | | |
|---|---|---|---|
| 3,880,434 A | 4/1975 | Echard |
| 4,088,330 A | 5/1978 | Chernykh |
| 4,749,199 A | 6/1988 | Gresh |
| 6,325,382 B1 | 12/2001 | Iwamoto |

FOREIGN PATENT DOCUMENTS

| | | |
|---|---|---|
| CH | 464625 A | 10/1968 |
| DE | 1103700 B | 3/1961 |
| DE | 1475657 A1 | 3/1969 |
| DE | 202008003418 U1 | 5/2008 |
| EP | 1914387 A1 | 4/2008 |
| JP | 2006083889 A | 3/2006 |

OTHER PUBLICATIONS

Pugnet, "Developpement Actuel Des Applications Des Garnitures D'Etancheite Seches Dans Les Compresseurs Centrifuges", Petrole Et Techniques, Association Francaise Des Techniciens Du Petrole, Paris, France, Nr. 370, Feb. 1, 1992, pp. 48-52, XP000263672, ISSN: 0152-5425.

*Primary Examiner* — Richard Edgar

(57) ABSTRACT

A shaft seal for sealing a gap between a shaft and a casing is provided. The shaft seal includes a plurality of sealing modules, at least one fluid feed and at least one fluid outlet. The sealing modules include an outer main seal, and inner main seal and a fluid drain between the two. Conventional shaft seals of the above type require significant amounts of additional barrier fluid in regular intervals to ensure suitable pressure gradients. In the presently provided shaft seal, the inner seal is designed as a radial double seal which is defined by two gas seals having respective rotating sealing surfaces and stationary sealing surfaces, the pair of sealing surfaces being opposite each other in a sealing plane. The sealing planes extend from the shaft in a substantially radial manner.

20 Claims, 4 Drawing Sheets

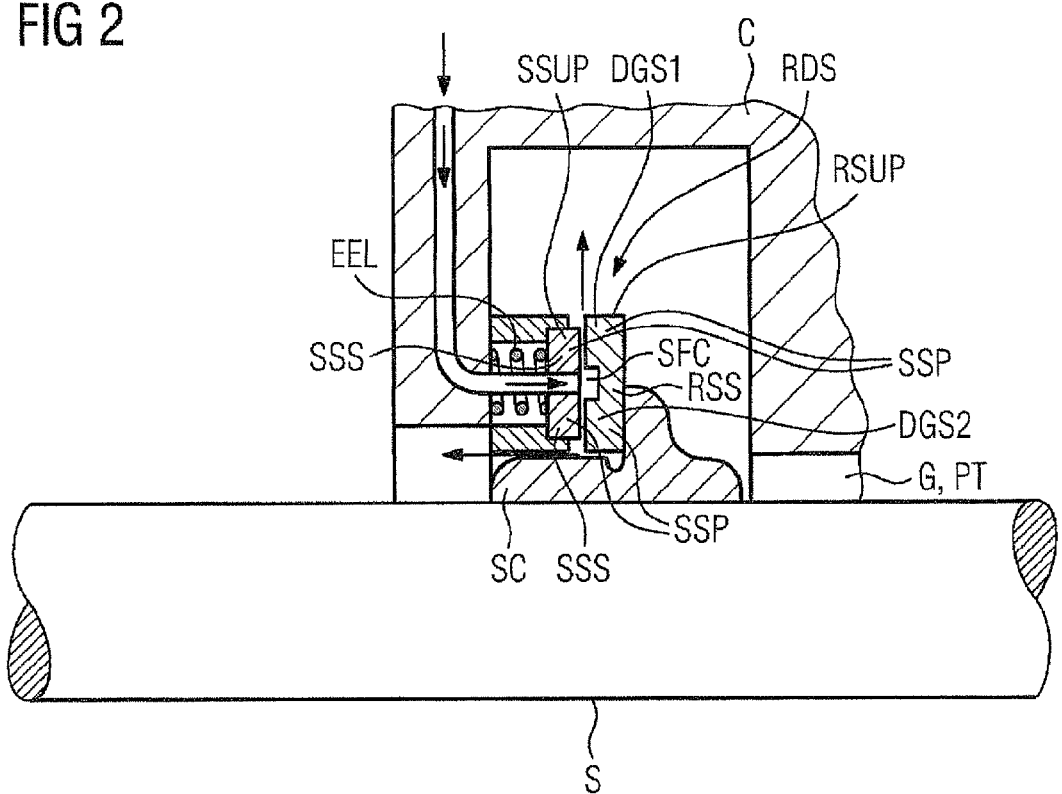

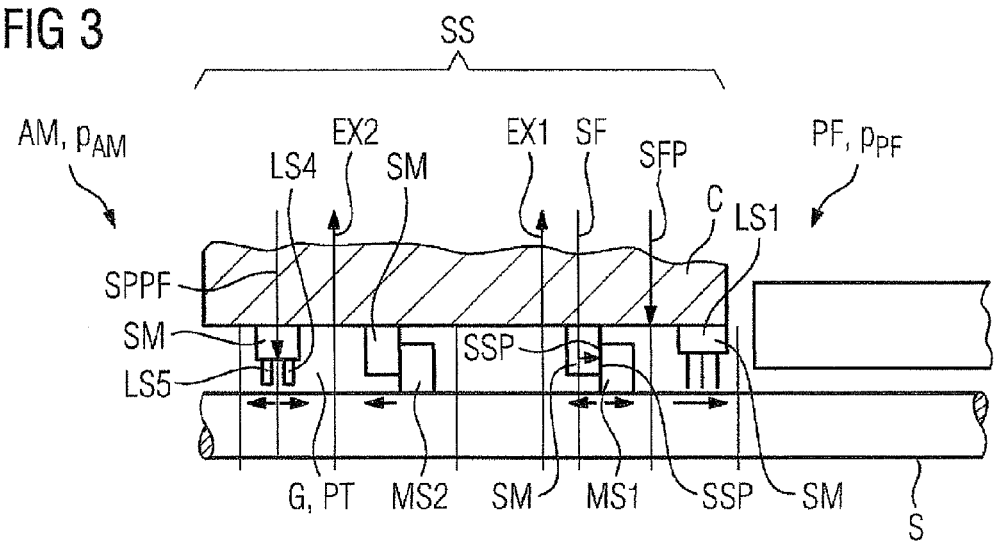
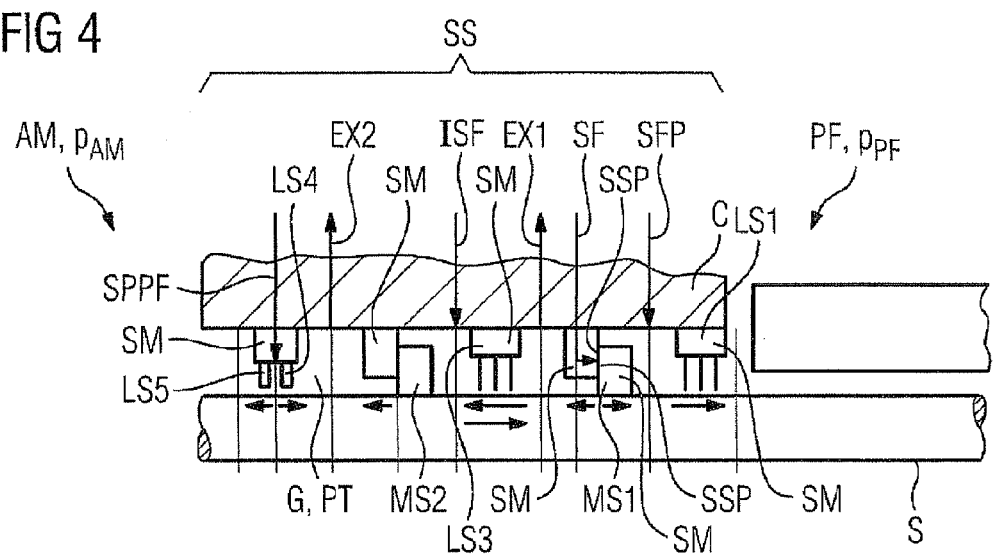

ARRANGEMENT COMPRISING A SHAFT SEAL

CROSS REFERENCE TO RELATED APPLICATIONS

This application is the U.S. National Stage of International Application No. PCT/EP2009/061404 filed Sep. 3, 2009 and claims the benefit thereof. The International Application claims the benefits of German application No. 10 2008 048 942.5.5 DE filed Sep. 25, 2008. All of the applications are incorporated by reference herein in their entirety.

FIELD OF INVENTION

The invention refers to a shaft seal for sealing a gap of a penetration of a shaft through a casing, wherein in the interior of the casing there is a process fluid under a sealing pressure and outside the casing an ambient fluid under an ambient pressure, wherein the shaft seal comprises more than one sealing module, at least one fluid feed and a fluid drain, wherein the sealing modules comprise at least one inner main seal and an outer main seal and between the two main seals provision is made for at least one fluid drain by means of which a first drain fluid is discharged. In addition, the invention also refers to an arrangement with a shaft seal of the aforesaid type.

BACKGROUND OF INVENTION

A shaft seal of the aforesaid type is frequently used particularly in turbomachines which have a shaft which is guided out of the casing and enables the connection of a drive or driven unit. It lies within the nature of the shaft seal that on account of the relative movement of the shaft surface to the adjacent casing a one hundred percent seal-tightness cannot be achieved. Particularly in the case of toxic or explosive process fluids, which should be kept away from the environment by means of the shaft seal, leakages must be carefully drained off. Also, for example in the case of steam turbines or gas turbines, the process fluid is prevented from discharging into the environment by means of such a shaft seal and the leakage of the shaft seal or the amount of discharge by suction has a direct influence upon the resulting thermal efficiency. Minimizing the leakages of a shaft seal is one of the most important tasks within the scope of the design of such machines.

In the case of turbocompressors, so-called tandem gas seals frequently undertake the task of sealing the pressure chamber inside the casing in relation to the atmosphere. The tandem gas seals are contactless seals and are lubricated with dry, filtered sealing fluid or sealing gas.

A conventional arrangement with a shaft seal of the aforesaid type is schematically shown in FIG. 1. A shaft S extends through a penetration PT of a casing C. In the interior of the casing C, there is a process fluid PF under a sealing pressure PPF. The process fluid PF is delivered by means of a compressor CO at the sealing pressure PPF. Outside the casing C, there is air AM under an ambient pressure PAM. A gap G between the shaft S and the casing C in the region of the penetration PT is sealed by means of a shaft seal SS. The shaft seal SS comprises a plurality of sealing modules SM, inter alia two main seals, these being a first main seal MS1 and a second main seal MS2. The two main seals MS1, MS2 are designed as gas seals DG1, DG2 or dry gas seals DGS. Starting from the interior of the casing C, provision is first made for two labyrinth seals, these being a first labyrinth seal LS1 and a second labyrinth seal LS2, between which a pressure-increasing sealing fluid SFP is introduced. The labyrinth LS1 and the pressure-increasing sealing fluid SFP have the purpose of increasing the sealing pressure to an at least necessary pressure level and are required only if the existing pressure in the compressor is lower than the at least necessary pressure level. Between the first main seal MS1 and the second, outer labyrinth seal LS2, moreover, a sealing fluid is fed into the gap G. As a consequence of the feed of sealing fluid SF, a mass flow is created through the first main seal MS1 to the outside and a mass flow through the labyrinth seal LS2 in the direction of the compressor. This mass flow as a rule is relatively low and does not build up any appreciable differential pressure in the labyrinth LS2. The mass flow of the pressure-increasing fluid SFP is measured so that together with the mass flow of the sealing fluid SF which flows through the labyrinth LS2 a pressure differential builds up in the labyrinth LS1 which in addition to the pressure in the compressor corresponds to the at least required pressure level. This mass flow flows back into the interior of the casing C. Between the first main seal MS1 and the second main seal MS2, provision is made for a third labyrinth seal LS3. Between the third labyrinth seal LS3 and the second main seal MS2, an intermediate sealing fluid ISF is introduced into the gap G. Whereas the sealing fluid SF is a process fluid PF, the intermediate sealing fluid ISF is either an inert fluid or inert gas or the ambient medium, in most cases being nitrogen.

Between the first main seal MS1 and the second main seal MS2, specifically inward of the third labyrinth seal LS3, the mixture of sealing fluid SF and intermediate sealing fluid ISF, or process fluid and inert fluid or ambient fluid, which accumulates there, is drained off to a subsequent process which is not shown in more detail. The process can also be a torch by means of which the mixture is burned off. Outward of the second main seal MS2, an additional tandem arrangement of a labyrinth seal is frequently located, consisting of two seals LS4, LS5, between which a separation fluid SPF is introduced. A mixture of separation fluid SPF and intermediate sealing fluid ISF, which flows in the outward direction through the second main seal MS2 as leakage, is directed by means of a second drain EX2 to a process or also to a torch.

Beneath the sealing arrangement, FIG. 1 shows the pressure pattern over the axial direction, from which results the flow directions through the seals. The dry gas seals are not optionally reversible with regard to throughflow. In this respect, under specific operating conditions an increased amount of pressure-increasing sealing fluid SFP has to be supplied.

The arrangement of the gas seal which is shown in FIG. 1 is also referred to as a tandem gas seal. In the type of construction of the tandem gas seal with or without labyrinth between the two main seals, the intermediate sealing fluid is only required with the type of construction with labyrinth. An intermediate sealing fluid is normally nitrogen from an external source. Both partial amounts of the sealing fluid SF between the main seal MS1 and the additional shaft seal LS2 and partial amounts of the intermediate sealing fluid ISF between the main seal MS2 and an adjacent additional shaft seal LS3 are fed to the first drain EX1, wherein the pressures, as in the pressure pattern which is shown beneath the schematic arrangement in FIG. 1, are selected in such a way that the greater part of the fed fluid finds its way into the first drain EX1. A smaller part of the intermediate sealing fluid finds its way into the second drain EX2 through the second main seal MS2. The additional shaft seals LS4 and LS5 with the fed separation fluid SPF essentially serves for shielding the outer main seal MS2 against contamination of the environment AM, which may be contaminated as a result of, for example, oil mist from an adjacent bearing. The separation fluid discharges partly into the environment AM and it is partly drained off in the second drain EX2. For the sealing module SM, consisting of the additional shaft seals LS4, LS5, carbon rings or other types of seal can also be used.

A radial double seal arrangement of the type referred to in the introduction is already known from DE 20 2008 003 418 U1. A tandem arrangement of a dry gas seal is known from JP 2006 08 38 89 A and from U.S. Pat. No. 3,880,434. A simple arrangement of a radial double seal is known from U.S. Pat. No. 6,325,382 B1. The tandem arrangement of a radial double seal with the interposition of a labyrinth seal is already known from EP 1 914 387 A1.

SUMMARY OF INVENTION

In the case of low sealing pressures, it happens that the sealing pressure, by means of the additional pressure-increasing sealing fluid SFP in the first additional shaft seal LS1, has to be increased so that there is a pressure gradient towards the first drain EX1. This is especially because the first main seal MS1, which is designed as a gas seal, always requires a pressure gradient from the space which is to be sealed, or from the sealing pressure, in the outward direction so as not to be destroyed with the rotation of the shaft.

Depending on how high the pressure has to be increased, considerable amounts of pressure-increasing sealing fluid SFP are required for this purpose. This again impairs the efficiency of the entire plant to a significant degree.

The invention therefore has made a point of improving the arrangement with the shaft seal of the type referred to in the introduction in such a way that the demand for sealing fluids decreases without leading to losses with regard to seal-tightness and reliability of operation.

For achieving the object according to the invention, an arrangement of the type referred to in the introduction with the features of the characterizing part of claim 1 is proposed.

When the terms inward or outward, inside or outside, are subsequently used, these direction indications refer to an increasing or decreasing proximity to the interior of the casing and to the exterior of the casing respectively.

Particular advantages ensue as a result of the features according to the invention. The amount of sealing fluid is greatly reduced since, compared with the conventional arrangement which is shown in FIG. 1, a labyrinth seal is no longer directly exposed to the admission of sealing fluid but the sealing fluid first has to pass through a sealing surface pair. It should added that a pressure increase by means of the pressure-increasing sealing fluid at low sealing pressures can be dispensed with since the radial double seal requires or creates a pressure gradient of the incoming sealing fluid on both sides. On account of dispensing with the pressure increase, the internal circulating amounts of fluid which is to be compressed are reduced and the volumetric efficiency of a compressor, for example, is improved. Finally, it becomes possible to realize sealing pressures below the ambient pressure. Since the radial double seals require only little axial space and in addition the option is opened up of letting in previously required additional shaft seals, the rotor dynamics of the shaft can be improved as a result of the shortening.

Furthermore, it is possible to select the pressure level in the first drain EX1 so that a return of fluid from the first drain EX1 back into the compressor process can be realized.

Preferably, the stationary carrier of the radial double seal is pretensioned in the direction of the rotating carrier by means of an elastic element. In this way, the construction of the rotor, being exposed to centrifugal force, is less complicated in its design.

The sealing surface pairs are preferably arranged coaxially so that a simple and space-saving construction results.

An optimum operation of the sealing arrangement according to the invention provides that the inner main seal is exposed to admission of process fluid as sealing fluid.

The outer main seal can be designed as a simple dry gas seal. Preferably, however, a radial double seal, which is exposed to admission of intermediate sealing fluid as sealing fluid, is also to be used for the outer main seal. The intermediate sealing fluid in this case, depending upon the type of medium which is to be compressed, can be identical to the sealing fluid of the inner main seal, or can be a different fluid, for example nitrogen. The guarantee that the outer main seal has a positive pressure difference on both sides at each operating point and that as a result a stable fluid film is created between the oppositely disposed sealing surfaces of the sealing surface pairs, is vital. Therefore, the requirement for building up a corresponding pressure in the first drain is dispensed with so that there is a minimum pressure difference to the outer main seal.

An advantageous development of the invention, especially if the second main seal MS2 is designed as a simple dry gas seal, provides that a first additional shaft seal LS3, preferably a labyrinth shaft seal, is arranged between the two main seals MS1 and MS2. In this way, it is ensured that no leakages of the first main seal MS1 find their way into the second drain EX2 via the second main seal MS2. In the development with this first additional shaft seal, it is expedient if the first sealing fluid drain is arranged on the inward side of this additional shaft seal between the two main seals.

An advantageous further development of the invention provides that between the outer main seal MS2 and this so-called additional shaft seal LS3 provision is made for a feed of an intermediate sealing fluid ISF.

For the same reasons as the first additional shaft seal can be advantageously arranged between the two main seals, it is expedient to provide a second additional shaft seal, preferably designed as a labyrinth shaft seal, inward of the inner main seal MS1. If the process fluid is loaded with particles or other dirt, it is expedient to provide a feed of a flushing fluid, which is preferably purified process fluid, between the inner main seal and the second additional shaft seal. This flushing fluid preferably has an overpressure of preferably 5 to 20 mbar in relation to the process fluid.

For shielding of the sensitive shaft seal system, it can also be expedient if two shaft seals, preferably labyrinth shaft seals, are additionally arranged in series outward of the outer main seal, these being an inner third additional shaft seal and an outer fourth additional shaft seal. The shielding is especially effective if provision is made for a feed of a separation fluid between these two additional shaft seals. In the case of this separation fluid, it can be filtered ambient medium. Such an arrangement is especially of interest if provision is made outwardly of the entire sealing arrangement for an oil bearing, for example, from which discharging oil mists can find their way into the sealing arrangements and would lead to possibly hazardous fluid mixtures.

The supplied separation fluid can be expediently drained off between the outer main seal and the two series-arranged third and fourth additional shaft seals by means of a second drain.

The drains if necessary can be led to a common combustion torch.

BRIEF DESCRIPTION OF THE DRAWINGS

In the following text, the invention is described in more detail based on exemplary embodiments with reference to drawings. In addition to the developments of the invention which are outlined in the exemplary embodiments, for the person skilled in the art additional embodiment possibilities are also gathered from the description. In the drawing:

FIG. 2 shows an exemplary view of a radial double seal,

FIGS. 3 to 6 show in each case an exemplary embodiment of an arrangement according to the invention in a schematic view.

DETAILED DESCRIPTION OF INVENTION

Figure 1:
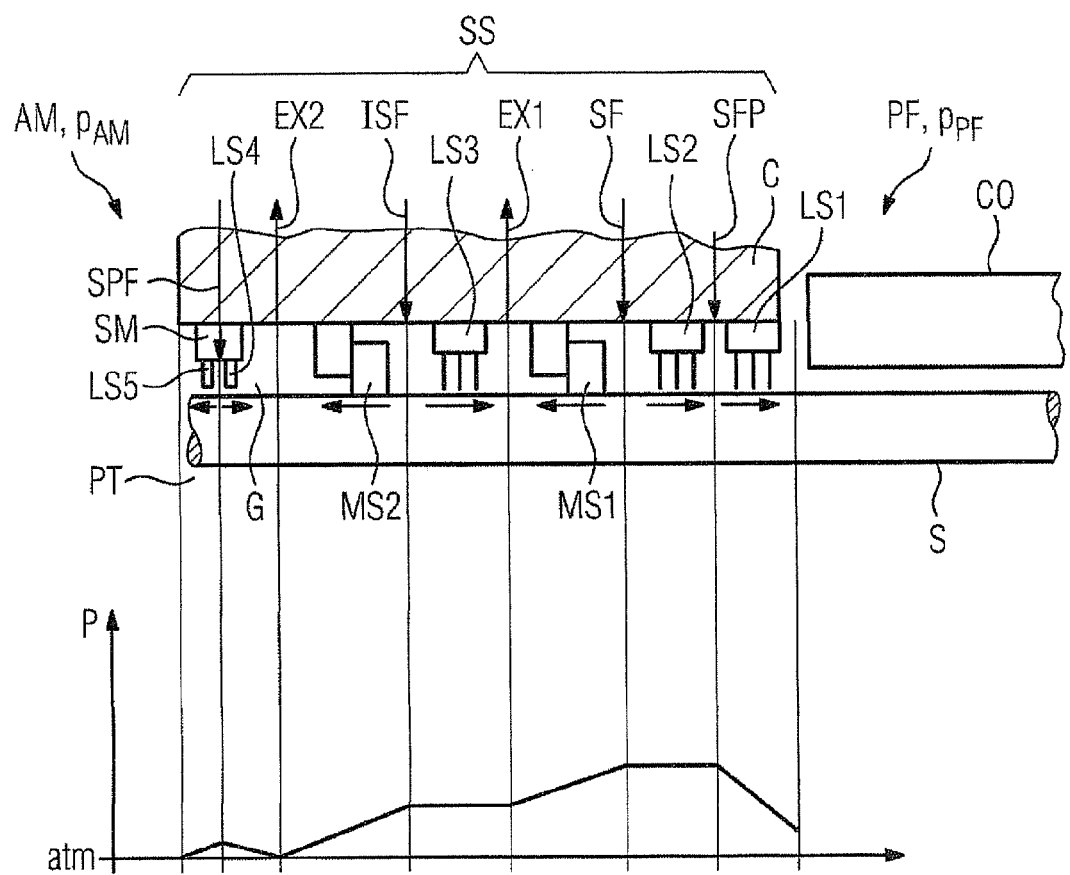
FIG. 1 shows a schematic view of a conventional arrangement.

The arrows beneath sealing modules SM indicate in each case the flow direction which is established during nominal operation.

FIG. 2 shows a schematic view of radial double seal RDS which seals a gap G between a shaft S and a casing C. In the region of a penetration PT of the shaft S through the casing C, the shaft S is provided with an encompassing shoulder SC which supports a rotating part of the radial double seal RDS. The radial double seal essentially comprises two gas seals DGS1, DGS2 which are arranged radially in series and have in each case a rotating sealing surface RSS and a stationary sealing surface SSS which correspondingly create two sealing surface pairs SSP. Between the two sealing surface pairs SSP, a sealing fluid SF is fed into a circumferentially extending chamber SFC which is located there and escapes on account of the overpressure between the rotating sealing RSS and the stationary sealing surface SSS in each case of the two sealing surface pairs SSP. The rotating sealing surfaces RSS and the stationary sealing surfaces SSS of the two sealing surfaces pairs SSP are interconnected in a fixed manner by means of a common carrier RSUP, SSUP. The stationary carrier SSUP is pretensioned towards the rotating carrier RSUP by means of an elastic element EEL.

FIG. 3 shows a development according to the invention of an arrangement consisting of a shaft S, a casing C and a shaft seal SS comprising a plurality of sealing modules SM. Beginning from the interior of the casing C, a first additional shaft seal LS1, designed as a labyrinth shaft seal, a main seal MS1, designed as a radial double seal according to FIG. 2, a second main seal MS2, designed as a simple dry gas seal, and an arrangement of two additional shaft seals LS4, LS5, which are arranged in series as labyrinth shaft seals, are part of the sealing modules. In the interior of the casing C, sealing pressure PPF of a process fluid PF prevails. A sealing flushing fluid SPF, which is purified process fluid PF with an overpressure of 5 to 20 mbar in relation to the sealing pressure, is fed between the first additional shaft seal LS1 and the first main seal MS1.

This feed prevents contamination of the entire sealing arrangement from a dirt-laden process fluid PF. If the process fluid should be sufficiently clean, these additional shaft seals LS1, LS2 can be dispensed with. In the first main seal MS1, sealing fluid SF in the faun of purified process fluid PF with an overpressure is fed so that an outflow ensues both inwardly and outwardly through the two sealing surface pairs SSP of the radial double seal. Between the first main seal MS1 and the second main seal MS2 there is a first drain EX1 which drains off the process fluid PF which flows outwards from the first main seal MS1. In relation to the space between the second main seal MS2 and the outwardly following seals, the space between the first main seal MS1 and the second main seal MS2 has an overpressure which is built up further as a result of the second main seal MS2 which is designed as a simple gas seal. Between the second main seal MS2 and the outwardly following seals there is a second drain EX2 which discharges a mixture of process fluid PF and fluid which originates from the outwardly following seal combination. The environment AM under an ambient pressure PAM lies outside the casing. A separation fluid SPPF, which drains in both directions and is to prevent any contaminants from outside entering the arrangement, is fed between the two additional shaft seals LS4 and LS5 at the outer end of the arrangement. In the case of the separation fluid SPPF, it is either the purified medium of the environment or an inert fluid, for example nitrogen.

In FIG. 4, the arrangement of FIG. 3 is supplemented by a third additional shaft seal LS3, which is designed as a labyrinth seal, between the two main seals MS1, MS2. The first drain EX1 is located inwardly of this additional third additional shaft seal LS3.

An intermediate sealing fluid ISF, for example nitrogen, is introduced between the third additional shaft seal LS3 and the second main seal MS2. As a result of this, the effect is achieved of no sealing fluid SF of the first main seal MS1 being able to find its way to the second main seal MS2 and, as leakage, being able to be discharged in the drain EX2.

Figure 5:
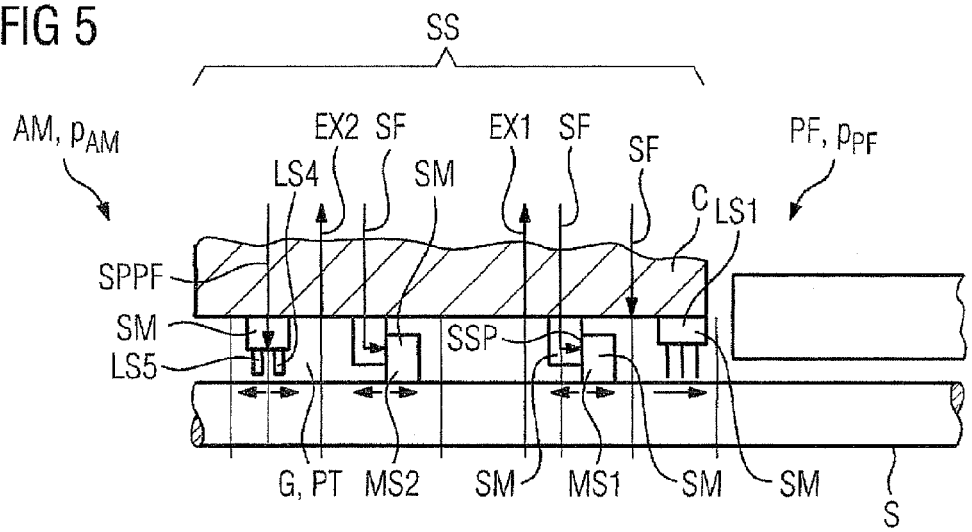

Shown in FIG. 5 is a development of the invention in which the second main seal MS2 is also designed as a radial double seal RDS.

Figure 6:
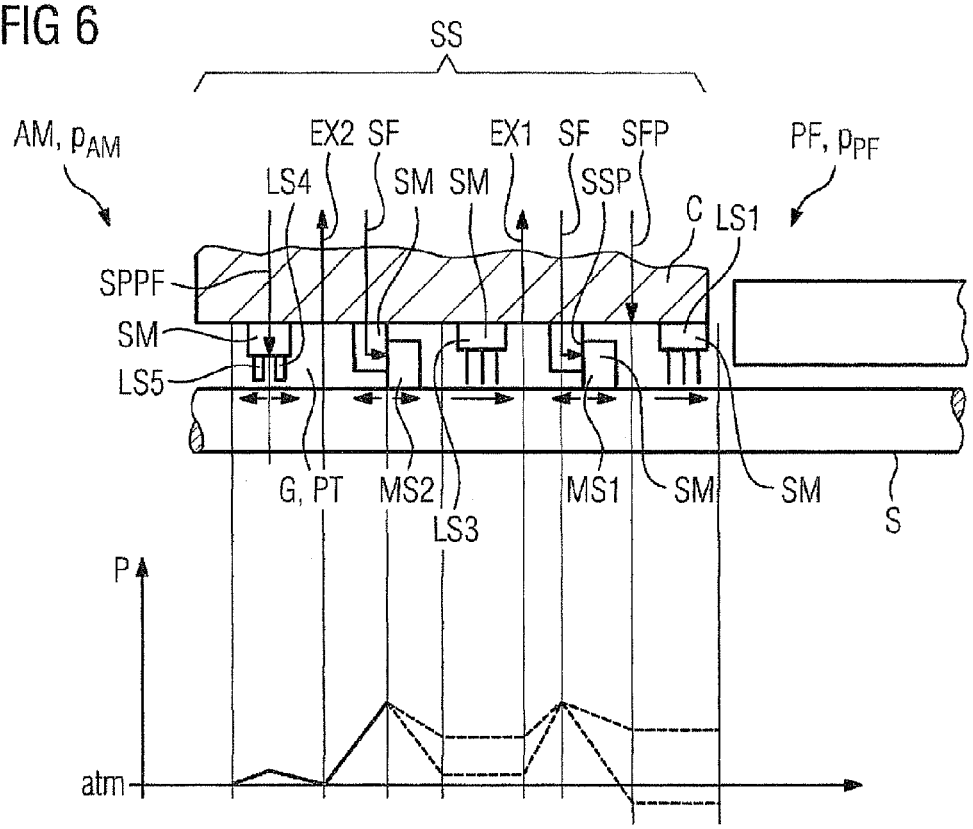

FIG. 6 shows the arrangement of FIG. 5 with an addition of a third additional shaft seal LS3 between the two main seals MS1, MS2. The pressure pattern over the axial extent of the sealing arrangement which is shown in FIG. 6 shows that the pressure P of the sealing fluid SF which is used lies above the other pressures and consequently a reliable sealing effect is constantly ensured in an operating state. In particular, no pressure-increasing sealing fluid SFP is required.

The invention claimed is:
1. A shaft seal for sealing a gap of a penetration of a shaft through a casing, wherein in an interior of the casing there is a process fluid under a sealing pressure and outside the casing there is an ambient fluid under an ambient pressure, the shaft seal comprising:
a fluid feed;
at least one fluid drain; and
a plurality of sealing modules, comprising:
an outer main seal; and
an inner main seal, wherein between the inner main seal and the outer main seal, a provision is made for a first fluid drain of the at least one fluid drain, via which first fluid drain a first drain fluid is discharged, and wherein the inner main seal is a radial double seal defined by a first gas seal and a second gas seal, each of the first and second gas seals comprising:
a sealing surface pair formed by a rotating sealing surface and a stationary sealing surface;
a sealing plane, wherein the sealing surface pair is oppositely disposed in the sealing plane, wherein the sealing plane of each of the first and second gas seals essentially has a radial extent in relation to the shaft, and wherein the sealing surface pair of the first gas seal is located at a larger radius than the sealing surface pair of the second gas seal; and a common carrier to which the stationary sealing surface and the rotating sealing surface are fastened to, wherein the stationary sealing surface and the rotating sealing surface are elastically tensioned towards each other by the common carrier being pretensioned by an elastic element, wherein between the sealing surface pair of the first gas seal and that of the second gas seal, a circumferentially extending sealing fluid chamber is provided which is exposed to an admission of sealing fluid via a sealing fluid feed.

2. The shaft seal as claimed in claim 1, wherein the common carrier includes a stationary carrier and a rotating carrier.

3. The shaft seal as claimed in claim 1, wherein the plurality of sealing modules further comprises a third additional shaft seal arranged between the outer main seal and the inner main seal, and wherein the first fluid drain is arranged on an inward side of the third additional shaft seal.

4. The shaft seal as claimed in claim 3, wherein between the outer main seal and the third additional shaft seal, a provision is made for a feed of an inteiniediate sealing fluid.

5. The shaft seal as claimed in claim 1, wherein outward of the outer main seal two additional shaft seals are arranged in series, the two additional shaft seals being an inner fourth additional shaft seal and an outer fifth additional shaft seal, and wherein between the outer main seal and the outer fourth additional shaft seal, a provision is made for a second fluid drain of the at least one fluid drain.

6. A shaft seal for sealing a gap of a penetration of a shaft through a casing, wherein in an interior of the casing there is a process fluid under a sealing pressure and outside the casing there is an ambient fluid under an ambient pressure, the shaft seal comprising:
a fluid feed;
at least one fluid drain; and
a plurality of sealing modules, comprising:
an outer main seal;
an inner main seal, wherein between the inner main seal and the outer main seal, a provision is made for a first fluid drain of the at least one fluid drain, via which first fluid drain a first drain fluid is discharged, and wherein the inner main seal is a radial double seal defined by a first gas seal and a second gas seal, each of the first and second gas seals comprising:
a sealing surface pair formed by a rotating sealing surface and a stationary sealing surface;
a sealing plane, wherein the sealing surface pair is oppositely disposed in the sealing plane, wherein the sealing plane of each of the first and second gas seals essentially has a radial extent in relation to the shaft, and wherein the sealing surface pair of the first gas seal is located at a larger radius than the sealing surface pair of the second gas seal; and
a common carrier to which the stationary sealing surface and the rotating sealing surface are fastened to, wherein the stationary sealing surface and the rotating sealing surface are elastically tensioned towards each other by the common carrier being pretensioned by an elastic element;
two additional shaft seals arranged in series outward of the outer main seal, the two additional shaft seals being an inner fourth additional shaft seal and an outer fifth additional shaft seal,
wherein between the sealing surface pair of the first gas seal and that of the second gas seal, a circumferentially extending sealing fluid chamber is provided which is exposed to an admission of sealing fluid via a sealing fluid feed, and
wherein a feed of a separation fluid is arranged between the inner fourth additional shaft seal and the outer fifth additional shaft seal.

7. The shaft seal as claimed in claim 6 wherein the common carrier comprises a stationary carrier and a rotating carrier.

8. The shaft seal as claimed in claim 7, wherein the stationary carrier is pretensioned by the elastic element.

9. The shaft seal as claimed in claim 6, wherein the sealing surface pairs are arranged coaxially to an axial extent of the shaft.

10. The shaft seal as claimed in claim 6, wherein the inner main seal is exposed to an admission of the process fluid as a sealing fluid.

11. The shaft seal as claimed in claim 6, wherein the outer main seal is a dry gas seal.

12. The shaft seal as claimed in claim 6, wherein the outer main seal is a radial double seal which is exposed to an admission of an intermediate sealing fluid as a sealing fluid.

13. The shaft seal as claimed in claim 6, wherein the plurality of sealing modules further comprises a third additional shaft seal arranged between the outer main seal and the inner main seal.

14. The shaft seal as claimed in claim 13, wherein the first fluid drain is arranged on an inward side of the third additional shaft seal.

15. The shaft seal as claimed in claim 6, wherein between the outer main seal and the third additional shaft seal, a feed of an intermediate sealing fluid is provided.

16. The shaft seal as claimed in claim 6, wherein the plurality of sealing modules further comprises a second additional shaft seal arranged inward of the inner main seal.

17. The shaft seal as claimed in claim 16, wherein between the inner main seal and the second additional shaft seal, a provision is made for a feed of a flushing fluid.

18. The shaft seal as claimed in claim 6, wherein between the outer main seal and the fourth additional shaft seal, a provision is made for a second fluid drain of the at least one fluid drain.

19. The shaft seal as claimed in claim 18, wherein the first fluid drain and the second fluid drain lead into a common drain.

20. A turbomachine, comprising:
a shaft;
a casing, wherein in an interior of the casing there is a process fluid under a sealing pressure and outside the casing there is an ambient fluid under an ambient pressure; and
a shaft seal for sealing a gap of a penetration of the shaft through the casing, comprising:
a fluid feed;
at least one fluid drain; and
a plurality of sealing modules, comprising:
an outer main seal;
an inner main seal, wherein between the inner main seal and the outer main seal, a provision is made for a first fluid drain of the at least one fluid drain, via which first fluid drain a first drain fluid is discharged, and wherein the inner main seal is a radial double seal defined by a first gas seal and a second gas seal, each of the first and second gas seals comprising:
a sealing surface pair formed by a rotating sealing surface and a stationary sealing surface;

a sealing plane, wherein the sealing surface pair is oppositely disposed in the sealing plane, wherein the sealing plane of each of the first and second gas seals essentially has a radial extent in relation to the shaft, and wherein the sealing surface pair of the first gas seal is located at a larger radius than the sealing surface pair of the second gas seal; and a common carrier to which the stationary sealing surface and the rotating sealing surface are fastened to, wherein the stationary sealing surface and the rotating sealing surface are elastically tensioned towards each other by the common carrier being pretensioned by an elastic element;

two additional shaft seals arranged in series outward of the outer main seal, the two additional shaft seals being an inner fourth additional shaft seal and an outer fifth additional shaft seal;

wherein between the sealing surface pair of the first gas seal and that of the second gas seal, a circumferentially extending sealing fluid chamber is provided which is exposed to an admission of sealing fluid via a sealing fluid feed, and wherein a feed of a separation fluid is arranged between the inner fourth additional shaft seal and the outer fifth additional shaft seal.

* * * * *